UNITED STATES PATENT OFFICE.

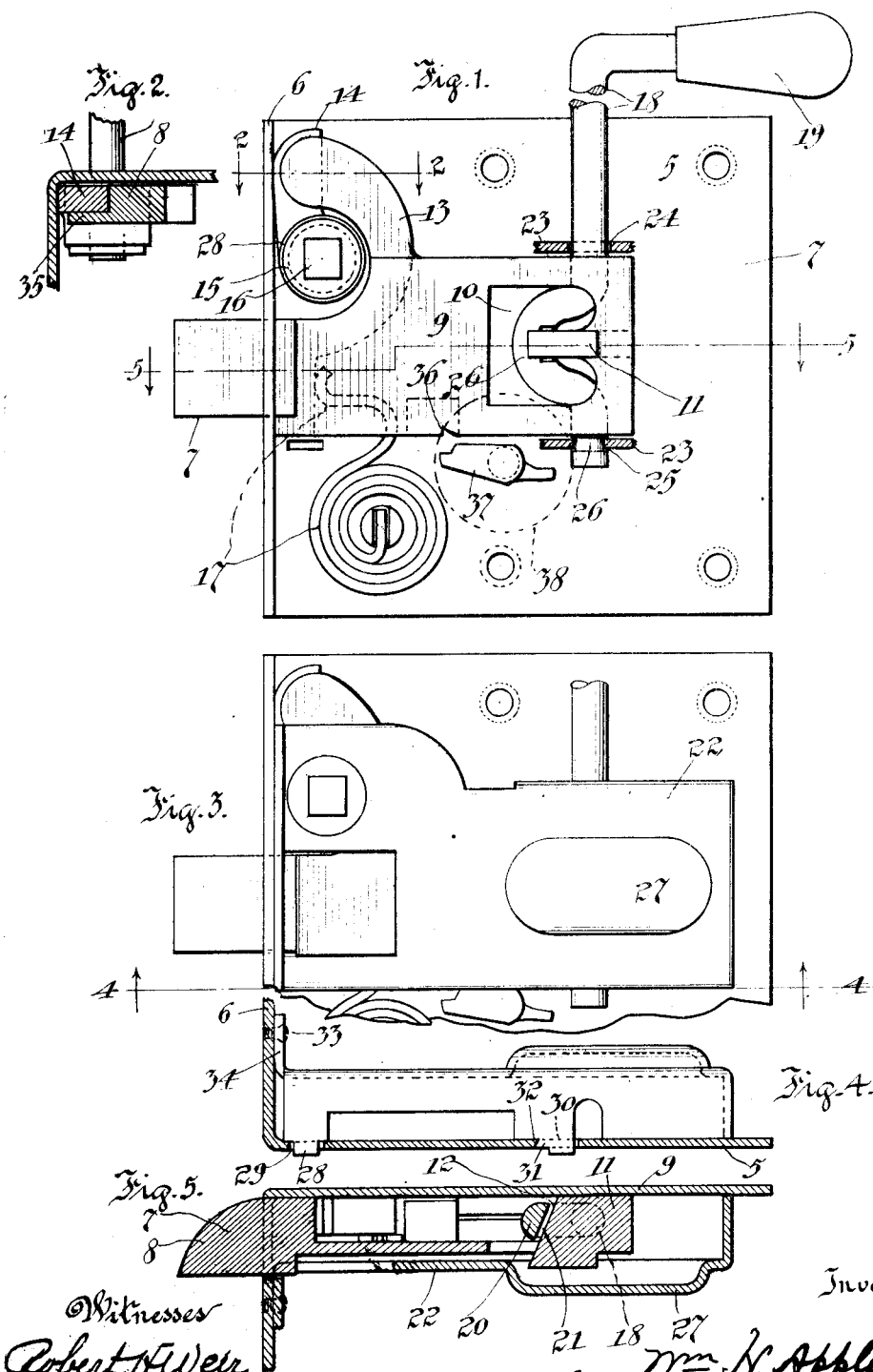
W. H. APPLEBY.
LOCK FOR VEHICLE DOORS.
APPLICATION FILED JAN. 10, 1913.
1,113,529. Patented Oct. 13, 1914.

WILLIAM HENRY APPLEBY, OF CHICAGO, ILLINOIS.

LOCK FOR VEHICLE-DOORS.

1,113,529.  Specification of Letters Patent.  Patented Oct. 13, 1914.

Application filed January 10, 1913. Serial No. 741,233.

*To all whom it may concern:*

Be it known that I, WILLIAM H. APPLEBY, subject of Great Britain, residing in the United States, and resident of Chicago, in the county of Cook and State of Illinois, have invented certain new and useful Improvements in Locks for Vehicle-Doors, of which the following is a full, clear, and exact specification.

This invention relates to improvements in locks for vehicle doors, such for example, as the doors for automobiles and carriages, in which the lock bolt is retracted against the resistance of the spring to unlock the door by means of a rod extending at a right angle to the path of movement of the bolt. Heretofore in locks of this type the bolt has been retracted by means of the engagement of a cam-like projection on the end of an oscillating rod engaging with the lug projecting laterally from the bolt, with the result that the direction of the force for retracting the bolt is outwardly beyond the path of movement of the bolt, the bolt subjected to a lateral pressure by the end thrust of the rod and hence not infrequently the bolt is so wedged in its bearings as to make it difficult of retraction notwithstanding the leverage afforded by the rod. Furthermore the rear end bearing of the bolt is an L-shaped plate which affords no substantial cover for excluding dust from the bolt, must be secured in place by three or more screws and is otherwise expensive of construction and besides is objectionably difficult of removal for access to the locking mechanism for repairing any of its parts and for cleansing, and which plate also forms one-half of a single bearing for the oscillating rod, the other half of which must be formed by upsetting the lock base plate.

The prime object of this invention is to have the bolt and the rod so constructed and arranged that the force for retracting the bolt is directed on a longitudinal line centrally thereof, and that the rod and cam through which this force is transmitted cannot produce a pressure laterally against the bolt, and whereby the movement of the bolt by the rod shall be perfectly free, in a direct line in its bearings, and with the entire absence of any lateral pressure tending to wedge the bolt in its bearings.

A still further object of this invention is to connect the rod and the lock bolt by means of opposing incline planes whereby the force necessary to actuate the bolt is reduced to a minimum.

A further object of this invention is to provide from one stamped up piece of sheet metal a cap or cover inclosing the lock bolt, the bearings thereof and of the rod, and also of the bearings of a knob shank and the follower thereof, by means of which the latch is retracted by a knob or handle thereon at the outside of the door, and independently of the rod for its retraction from within the vehicle.

A further object of this invention is to have such a cap or cover so constructed that it is held in its operative position against accidental detachment, by means of not more than a single screw as that, providing in connection with an annular groove in the rod, a means sustaining the rod against longitudinal movement.

Another object of this invention is to have the cap or cover so constructed that its surface forms a bearing for the lock bolt without obstructing the movement of the opposing incline planes rising, as they necessarily do, in a plane above the face of the shank of the lock bolt.

Another object of this invention is to reduce the cost of and simplify the construction of locks for vehicles in which an oscillating rod is employed for retrating a lock bolt.

With these ends in view, my invention finds embodiment in certain features of novelty in the construction, combination and arrangement of parts by which the said objects and certain other objects are hereinafter attained, all as fully described with reference to the accompanying drawing, and more particularly pointed out in the claims.

In said drawing: Figure 1 is a plan view of the lock with the cap or casing removed. Fig. 2 is a detail section on the line 2—2 of Fig. 2. Fig. 3 is a plan view of the lock with the cap or casing in its operative position inclosing the bearings for the rod, the opposing incline lug therefor, and other parts of the lock mechanism. Fig. 4 is a section on the line 4—4 of Fig. 3 looking in the direction of the arrows, and Fig. 5 is a section on the line 5—5 of Fig. 1.

Similar characters of reference indicate the same parts in the several figures of the drawing.

5 indicates the base plate for the latch mechanism, and which is also one side of the casing of the latch, the other side of which is formed by the adjacent face of a door, the front plate of the casing through which the latch bolt 7 is projected being formed by a right angle bend 6, provided with a slot through which the latch bolt 7 is projected, the end of which bolt is curved as usual at 8 to facilitate its engagement with the keeper, not shown.

The shank of the latch bolt, which as shown, is preferably integral with the latter, consists of a plate 9, is provided with a slot 10 and with a lug 11 projecting therein, substantially in line with the longitudinal center of the latch bolt and projecting both above and below the shank 9 of which it is preferably an integral part. The inner, or operative face 12 of which lug is inclined as shown in Fig. 5.

From the shank like plate 9 projects a curved arm 13 preferably cast therewith, adapted to be engaged by the lug 14 of the hub 15, provided with a rectangular opening 16, adapted to receive the shank of a knob or handle on the outside of the door, for the retraction of the lock bolt by a person standing outside the vehicle, the lock bolt being automatically moved to and maintained in its projected operative position by means of a coiled spring 17, or other form of spring commonly used for that purpose having a free end bearing against some fixed portion of the lock bolt.

For convenience of the occupant of the carriage the lock bolt is retracted by means of a rotatable vertical rod 18 having a handle 19 bent to form, which rod is provided with an angle bend 20 having a flat face 21 opposing the inclined face 12 of the lug, and whereby the contacting surface between the lug and the crank arm form opposing parallel incline planes.

Inclosing the shank of the latch bolt is a cap or casing 22, which, as shown, is preferably stamped to form from a single piece of metal, the opposing sides 23 of which are respectively provided at their edges with slots 24 and 25 forming bearings for the rod 18, and for which purpose the adjacent end of the rod is provided with an annular groove 26 into which the adjacent flange 23 projects so that when the cap 22 is in its operative position, bearing surfaces are not only provided at each side of the shank plate 9 for the rod, but the rod is held against endwise movement when in operation.

The cap 22 is provided with a dome 27 struck therefrom, for the projecting of the incline lug 11, outwardly beyond the shank plate, to afford a bearing of sufficient length for such a stroke of the crank arm of the rod as will permit a full and necessary length of stroke of the bolt in both directions. The cap or cover is also provided with a lug 28 fitting a slot 29 in the base plate 5, and with opposing lugs 30, that is to say at each side of the cap, and projecting through slots in the base plate, one of which is stepped, the edge of the metal step 31 being inclined inwardly and adapted to fit against a corresponding incline 32 in the plate 5 so that by tilting the forward end of the plate to introduce the lug 28 in the slot 29, the incline step 31 will move to engagement with the opposing edge of the base plate 5, and thereby prevent the cap from being removed without first lifting its rear end, and as a result of which a single screw passed through a flange 34 on the cap, and the face plate 6 is sufficient to prevent the accidental detachment of the cap, which serves to substantially exclude dust from the locking mechanism.

The end of the arm 13 of the latch bolt adapted to engage the follow 14 for the knob shank is provided with a flange 35 (see Fig. 2), overlapping the follow, and thereby maintaining the follow and the bearing for the knob shank against rocking, or being tilted out of their operative position.

As a means for locking the bolt 7 when the door is locked and the bolt is in its keeper, the shank plate of the bolt is provided with a notch 36 adapted to be engaged by a detent 37, manipulated by a knob 38 indicated by dotted lines in Fig. 1.

In operation, when the door is closed and secured by the projection of the lock bolt into its keeper (not shown) it may be opened by the occupant by taking hold of the handle 19 and turning it for about a quarter turn, and on the occurrence of which the crank arm will engage the inclined face of the lug and moving upwardly along said face retract the bolt. On releasing the crank arm the bolt will assume its normally projected position automatically by the operation of the spring 17.

By providing the crank arm of the rod with the inclined bearing surface 21 parallel to the inclined face of the lug 11, the crank arm has an upwardly sliding movement against the face of the lock as distinguished from a turning and grinding movement it would otherwise have, and the movement which directs the force applied to these opposing surfaces on a line in a plane with the movement of the bolt, which force being also centralized with reference to the longitudinal center of the bolt is necessarily less than that required for moving the bolt, and with less friction between the two parts than if the surface of the crank arm opposed to the lug were round instead of flat. Furthermore, by confining the rod and crank arm against an end thrust by projecting the rod inwardly beyond the crank arm, and having it held by the cap or cover, the bolt is isolated from a lateral pressure tending to make it bind in its bearings, and in any event requiring a greater force to move it on manipulating it with the rod, and in this connection it is proper to observe that by the transmisison of the operating force through opposing inclined surfaces the frictional wear of the parts at this point is materially reduced, as will be appreciated when bearing in mind that when, as in previous constructions, the curved surface of the rod cam bearing against the vertical surface of a lug projecting laterally of the lock bolt, there is an objectionable frictional wearing away of both of these distinctive forms of opposing surfaces.

Among the advantages of my invention is that lock mechanism as a whole is much cheaper in construction, more convenient of access for repairs and cleansing, its locking mechanism more fully isolated from dust and other foreign substances, and that by the direction of the force for retracting the lock bolt through the longitudinal center of the lock bolt, and transmitting it thereto by parallel opposing incline planes, at all times there is a free and direct movement of the lock bolt with the expenditure of a minimum degree of force.

Having described my invention, what I claim and desire to secure by Letters Patent is:

1. A lock for vehicle doors comprising in combination a lock bolt, an oscillating rod projecting at a right angle to the path of movement of the lock bolt, a crank arm in said rod, an opposing lug on the lock bolt, the contacting surfaces between said lug and crank arm being in the form of opposing inclined planes.

2. A lock for vehicle doors comprising in combination a lock bolt, an oscillating rod projecting laterally at a right angle to the length of said bolt, inclined surfaces on said rod, and lock bolt in opposition to each other, whereby a force for retracting the lock bolt is directed away from the rod in a line through the longitudinal axis of the lock bolt.

3. A lock for vehicle doors comprising in combination a lock bolt, a lug thereon provided with an inclined surface, a rod extending at a right angle to the path of movement of and adapted to engage said lug and actuate the lock bolt, a single piece dust cap, and means connecting said cap with the rod, whereby the rod is sustained against longitudinal movement, substantially as described.

4. A lock for vehicle doors comprising in combination a lock bolt, a rod projecting at right angles thereto, means connecting said rod and lock bolt, whereby on turning the rod the lock bolt is retracted, and a single piece dust cap inclosing said lock bolt, and the opposing surface of the rod provided with bearings for the rod, one of which locks the rod against longitudinal movement when the cap is in its operative position, substantially as described.

5. A lock for vehicle doors comprising in combination a lock bolt, a base support therefor, a spring automatically projecting said lock bolt, said lock bolt being provided with a shank plate having therein a slot, a lug projecting into said slot provided with an inclined face, a rod extending at a right angle to the path of movement of the bolt, having a crank arm bent therein, provided with a flat inclined face parallel to and opposing said lug, the inner end of said rod being provided with an annular groove and a detachable single piece cover projecting into said groove and maintaining said rod against longitudinal movement, substantially as described.

In witness whereof, I have hereunto set my hand and affixed my seal, this 7th day of January A. D. 1913.

WILLIAM HENRY APPLEBY. [L. S.]

Witnesses:
JNO. G. ELLIOTT,
MILDRED ELSNER.